United States Patent
Zhou

(10) Patent No.: US 9,609,028 B2
(45) Date of Patent: Mar. 28, 2017

(54) METHOD, APPARATUS AND SYSTEM FOR ESTABLISHING SESSION

(71) Applicant: ZTE Corporation, Shenzhen (CN)

(72) Inventor: Xiaoyun Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 7 days.

(21) Appl. No.: 14/430,826

(22) PCT Filed: Sep. 5, 2013

(86) PCT No.: PCT/CN2013/083006
§ 371 (c)(1),
(2) Date: Mar. 24, 2015

(87) PCT Pub. No.: WO2014/056374
PCT Pub. Date: Apr. 17, 2014

(65) Prior Publication Data
US 2015/0256561 A1     Sep. 10, 2015

(30) Foreign Application Priority Data

Oct. 12, 2012 (CN) .......................... 2012 1 0387157

(51) Int. Cl.
*H04W 80/04* (2009.01)
*H04L 29/06* (2006.01)
(Continued)

(52) U.S. Cl.
CPC ...... *H04L 65/1069* (2013.01); *H04L 41/0893* (2013.01); *H04L 67/141* (2013.01);
(Continued)

(58) Field of Classification Search
CPC . H04L 65/1066; H04L 65/2602; H04L 12/14; H04W 80/04; H04W 48/08; H04W 8/12
See application file for complete search history.

(56) References Cited

U.S. PATENT DOCUMENTS

2011/0138005 A1* 6/2011 Zhou ................... H04L 12/14
709/206
2011/0173332 A1* 7/2011 Li ...................... H04L 12/14
709/227
(Continued)

FOREIGN PATENT DOCUMENTS

CN        102340757 A        2/2012
CN        102340766 A        2/2012
(Continued)

OTHER PUBLICATIONS

International Search Report for corresponding application PCT/CN2013/083006 filed Sep. 5, 2013; Mail date Dec. 12, 2013.
(Continued)

*Primary Examiner* — Andrew Lee
(74) *Attorney, Agent, or Firm* — Cantor Colburn LLP

(57) ABSTRACT

Provided are a method, an apparatus and a system for establishing a session. In the method, a Visit Policy and Charging Rules Function (V-PCRF) receives an S9 session establishment triggering message from a Home Policy and Charging Rules Function (H-PCRF), wherein the S9 session establishment triggering message is used for triggering establishment of an S9 session and a first S9 sub-session, and the first S9 sub-session is used for policy control of Evolved Packet Core (EPC)-routed traffic; the V-PCRF determines whether the S9 session has been or is being established; and when it is determined that the S9 session has been or is being established, the V-PCRF indicates to the H-PCRF that the S9 session has been or is being established. Through the solution, conflict is avoided in the process of establishing the S9 sub-session in the related art and the stability of the system is improved.

20 Claims, 11 Drawing Sheets

(51) Int. Cl.
*H04W 76/02* (2009.01)
*H04L 29/08* (2006.01)
*H04L 12/24* (2006.01)
*H04W 84/04* (2009.01)
*H04M 15/00* (2006.01)
*H04W 4/24* (2009.01)

(52) U.S. Cl.
CPC ......... *H04W 76/02* (2013.01); *H04W 76/022* (2013.01); *H04M 15/66* (2013.01); *H04M 15/8038* (2013.01); *H04W 4/24* (2013.01); *H04W 84/042* (2013.01)

(56) References Cited

U.S. PATENT DOCUMENTS

| | | | |
|---|---|---|---|
| 2012/0021741 A1* | 1/2012 | Pancorbo Marcos | H04L 12/14 455/433 |
| 2012/0036257 A1* | 2/2012 | Mann | H04L 65/1066 709/224 |
| 2012/0246325 A1* | 9/2012 | Pancorbo Marcos | H04L 12/2602 709/227 |
| 2013/0095825 A1* | 4/2013 | Mann | H04W 8/12 455/432.3 |
| 2013/0095826 A1* | 4/2013 | Vrbaski | H04W 8/12 455/432.3 |
| 2013/0097325 A1* | 4/2013 | Mann | H04W 76/022 709/227 |
| 2013/0115919 A1* | 5/2013 | Xu | H04W 12/06 455/411 |
| 2015/0036672 A1* | 2/2015 | Kim | H04W 48/08 370/338 |

FOREIGN PATENT DOCUMENTS

| | | |
|---|---|---|
| CN | 102655634 A | 9/2012 |
| CN | 102843780 A | 12/2012 |

OTHER PUBLICATIONS

Author Unknown: "3rd Generation Partnership Project: Technical Specification Group Core Network and Terminals; Policy and Charging Control (PCC) over S9 Reference Point; Stage 3"; (Release 11); vol. CT WG3, No. V11.6.0; XP050649635; Sep. 21, 2012; pp. 80.

International Search Report for corresponding application PCT/CN2013/083006 filed Sep. 5, 2013; Mail date Dec. 12, 2013; pp. 8.

* cited by examiner

METHOD, APPARATUS AND SYSTEM FOR ESTABLISHING SESSION

TECHNICAL FIELD

The disclosure relates to the field of communications, and more particularly to a method, an apparatus and a system for establishing a session.

BACKGROUND

FIG. 1 is a diagram showing a composition architecture of an Evolved Packet System (EPS) of the 3rd Generation Partnership Project (3GPP) according to the related art. As shown in FIG. 1, the network architecture of the EPS in a non-roaming scenario includes an Evolved Universal Terrestrial Radio Access Network (E-UTRAN), a Mobility Management Entity (MME), a Serving Gateway (S-GW), a Packet Data Network Gateway (P-GW), a Home Subscriber Server (HSS), a Policy and Charging Rules Function (PCRF) entity and other support nodes.

The PCRF is the core of Policy and Charging Control (PCC) and is responsible for making a policy decision and a charging rule. The PCRF provides network control rules based on service data streams, and the network control mainly includes service data stream detection, gating control, control for Quality of Service (QoS), a charging rule based on the data streams and the like. The PCRF sends the policy and the charging rule made thereby to a Policy and Control Enforcement Function (PCEF) entity for execution, and at the same time, the PCRF may further need to ensure that these rules are consistent with the subscription information of a user. The basis of making a policy and a charging rule by the PCRF includes: the information related to a service acquired from an Application Function (AF); the policy and charging control subscription information of the user acquired from a Subscription Profile Repository (SPR); and the information of a network related to a bearer acquired from the PCEF.

The EPS supports the interworking with a non-3GPP system, which is implemented through an S2a/b/c interface. The P-GW serves as an anchor between a 3GPP system and a non-3GPP system. As shown in FIG. 1, the non-3GPP system is divided into a trusted non-3GPP IP access network and a non-trusted non-3GPP IP access network. The trusted non-3GPP IP access network can be connected to the P-GW directly through an S2a interface. The non-trusted non-3GPP IP access network needs to pass through an Evolved Packet Data Gateway (ePDG) to be connected to the P-GW, and the interface between the ePDG and the P-GW is an S2b interface. Signalling and data between a User Equipment (UE) and an ePDG are encrypted for protection through an Internet Protocol Security (IPSec). An S2c interface provides control and mobility support related to a user plane between the UE and the P-GW, and the mobility management protocol supported by the S2c interface is mobile IPv6 supporting double stacks (i.e. DSMIPv6).

At present, many operators are concerned about the Fixed Mobile Convergence (FMC) technology very much and have studied the interconnection and interworking technology of the 3GPP and the Broadband Forum (BBF).

FIG. 2 is a diagram showing a roaming architecture of a home router in a policy interworking scenario in which a UE accesses a 3GPP core network through a BBF access network according to the related art. As shown in FIG. 2, the BBF access network is regarded as the non-trusted non-3GPP IP access network. The user accesses a mobile core network through the BBF access network. At present, there are two service ways based on the architecture. One way is that the service accessed by the UE needs to be routed back to the EPC, which way is called Evolved Packet Core (EPC) routed. The other way is that the service accessed by the UE is not routed back to the EPC, but directly routed to a service network from a BBF network, which way is called a Non-seamless WLAN Offload (NSWO). In the roaming scenario in FIG. 2, the BBF access network needs to implement interworking with a Home PLMN (HPLMN) through a Visited Public Land Mobile Network (VPLMN), including authentication, data routing, policy control and the like.

FIG. 3 is a diagram showing the roaming architecture of a home router in a policy convergence scenario in which a UE accesses a 3GPP core network through a BBF access network according to the related art. As shown in FIG. 3, the difference between FIG. 2 and FIG. 3 mainly lies in that the BBF access network and the VPLMN usually belong to a same operator, a Visit PCRF (V-PCRF) supports the interaction with an IP edge through a Gxd interface, and a Home PCRF (H-PCRF) needs to interact with the BBF access network through the V-PCRF.

FIG. 4 is a diagram showing the attachment flow when a UE accesses a 3GPP core network through a fixed broadband access network according to the related art. As shown in FIG. 4, which is a diagram showing the attachment flow when a UE accesses a 3GPP network through the PMHV6 protocol based on the architecture diagram shown in FIG. 2. In the FIG. 4, a GPRS Tunnel Protocol (GTP) is adopted between the ePDG and the P-GW, and the flow includes the following steps.

Step S402: A UE accesses a BBF access system to execute 3GPP-based access authentication. A BBF AAA interacts with a 3GPP AAA server through a 3GPP AAA proxy (or an AAA server further interacts with an HSS) to complete EAP authentication.

Step S404: The UE acquires a local IP address allocated by the BBF access network.

Step S406: Triggered by Step S402 or S404, a BPCF is notified of the access of the UE through the BBF access network.

Step S408: When the BPCF receives triggering and supports policy interworking with the PCRF, the BPCF sends a CCR message to the V-PCRF to request for establishing an S9a* session if a local policy indicates that policy control for NSWO traffic can be provided to the user, wherein the CCR message carries a user identifier, a local IP address of the UE and NSWO-APN.

Step S410: When determining that the S9 session of the user has not been established yet, the V-PCRF sends a CCR message (an S9 session establishment message) to an H-PCRF to request for establishing the S9 session and an S9 sub-session, wherein the sub-session contains an information user identifier, a local IP address of the UE and NSWO-APN. The V-PCRF saves the corresponding relationship between the S9a* session and the S9 sub-session. The S9 sub-session is used for the policy control of the NSWO traffic.

Step S412: The H-PCRF returns an acknowledgement message (i.e., a CCA message) after making a policy decision and sends the policy to the V-PCRF through the S9 sub-session.

Step S414: The V-PCRF further sends the policy to the BPCF through the CCA message.

Step S416: The UE dynamically selects an ePDG in a visited network, initiates an IKEv2 tunnel establishment process and carries out authentication through EAP. The ePDG acquires a local IP address of the UE.

Step S418: The ePDG selects a P-GW and sends a session establishment request message to the selected P-GW, wherein the message carries a user identifier, a local IP address of the UE and the like. After receiving the request message, the P-GW allocates an EPC IP address to the UE to establish a binding context.

Step S420: The PCEF in the P-GW sends an IP-CAN session establishment indication message to the H-PCRF, wherein the message carries a user identifier, a PDN identifier, a local IP address of the UE and a UE EPC IP address. The H-PCRF carries out QoS authorization according to the user identifier and other information and returns an acknowledgement message to the PCEF.

Step S422: The P-GW sends a P-GW IP address update message to an AAA server and sends the address of the P-GW to the AAA server. The AAA server further interacts with the HSS, and the HSS saves the address of the P-GW.

Step S424: The P-GW returns a session establishment acknowledgement message to the ePDG, wherein the message carries an EPC IP address.

Step S426: After the proxy binding is updated successfully, an IPSec tunnel is established between the UE and the ePDG.

Step S428: The ePDG sends the last IKEv2 signalling to the UE, wherein the signalling carries an IP address of the UE.

Step S430: Triggered by Step S418, the H-PCRF sends an RAR message (an S9 sub-session establishment triggering message) to the V-PCRF to trigger the establishment of an S9 sub-session for the policy control of EPC-routed traffic when determining that the S9 session has been established for the user, wherein the message carries a user identifier, an APN and a local IP address of the UE.

Step S432: The V-PCRF returns an RAA message to the H-PCRF, i.e., the V-PCRF returns an acknowledgement message to the H-PCRF.

Step S434: The V-PCRF sends a CCR message (an S9 session modification message) to the H-PCRF to modify the S9 session and establish an S9 sub-session, wherein the sub-session is used for the policy control of EPC-routed traffic.

Step S436: The H-PCRF returns a CCA message to the V-PCRF to confirm the S9 session modification message.

Step S438: Triggered by Step S430, the V-PCRF sends a TER message to the BPCF to trigger the establishment of an S9a session, wherein the message carries a user identifier and an IP address of the UE.

Step S440: The BPCF returns a TEA message to the V-PCRF to confirm the S9a session establishment triggering message.

Step S442: The BPCF sends a CCR message to the V-PCRF to request for establishing an S9a session.

Step S444: The V-PCRF returns a CCA message to the BPCF to confirm the establishment of the S9a session.

Step S446: The BPCF provides a policy to an IP edge.

In the Steps above, in Step S430, it is assumed that the H-PCRF has received the CCR message sent in Step S410, namely, S9 session has been established. However, Step S406 and Step S416 may be concurrent actually. Therefore, the H-PCRF may have received the message sent in Step S418 before receiving the message sent in Step S406. Because no S9 session is established, the H-PCRF may send an S9 session triggering message to the V-PCRF. However, after the message is sent, the H-PCRF receives an S9 session establishment message for the establishment of S9 sub-session of the NSWO. Thus, the V-PCRF may think the H-PCRF executes a wrong flow.

To avoid conflict in the process of establishing the S9 sub-session in the related art, there is still no effective solution.

SUMMARY

To avoid conflict in the process of establishing an S9 sub-session in the related art, the embodiments of the disclosure provides a method, an apparatus and a system for establishing a session, so as to at least solve the problem above.

In one aspect, an embodiment of the disclosure provides a method for establishing a session, including: a V-PCRF receives an S9 session establishment triggering message from an H-PCRF, wherein the S9 session establishment triggering message is used for triggering establishment of an S9 session and a first S9 sub-session, and the first S9 sub-session is used for policy control of EPC-routed traffic; the V-PCRF determines whether the S9 session has been or is being established; and when it is determined that the S9 session has been or is being established, the V-PCRF indicates to the H-PCRF that the S9 session has been or is being established.

In an example embodiment, the V-PCRF indicating to the H-PCRF that the S9 session has been or is being established may include that: the V-PCRF sends an acknowledgement message to the H-PCRF, wherein the acknowledgement message carries an indicator for indicating that the S9 session has been or is being established.

In an example embodiment, before the V-PCRF determines whether the S9 session has been or is being established, the method may further include: the V-PCRF sends a session establishment message to the H-PCRF, wherein the session establishment message is used for the establishment of the S9 session and a second S9 sub-session, and the second S9 sub-session is used for policy control of NSWO traffic.

In an example embodiment, after the V-PCRF sends a session establishment message to the H-PCRF, the method may further include that: the H-PCRF receives the session establishment message from the V-PCRF; and the H-PCRF sends an S9 sub-session establishment triggering message to the V-PCRF, wherein the S9 sub-session establishment triggering message is used for triggering the establishment of the first S9 sub-session.

In an example embodiment, after the H-PCRF sends an S9 sub-session establishment triggering message to the V-PCRF, the method may further include that: the V-PCRF sends a session modification message to the H-PCRF, wherein the session modification message is used for the establishment of the first S9 sub-session.

In another aspect, an embodiment of the disclosure provides a method for establishing a session, including: an H-PCRF sends an S9 session establishment triggering message to a V-PCRF, wherein the S9 session establishment triggering message is used for triggering establishment of an S9 session and a first S9 sub-session, and the first S9 sub-session is used for policy control of EPC-routed traffic; the H-PCRF receives an indicator which indicates that the S9 session has been or is being established from the V-PCRF; and the H-PCRF sends an S9 sub-session establishment triggering message to the V-PCRF, wherein the S9 sub-session establishment triggering message is used for triggering the establishment of the first S9 sub-session.

In an example embodiment, the H-PCRF receiving an indicator which indicates that the S9 session has been or is being established from the V-PCRF may include that: the H-PCRF receives an acknowledgement message from the V-PCRF, wherein the acknowledgement message carries an indicator for indicating that the S9 session has been or is being established.

In an example embodiment, before the H-PCRF sends an S9 session establishment triggering message to the V-PCRF, the method may further include that: the H-PCRF detects that the S9 session has not been established yet.

In another aspect, an embodiment of the disclosure provides an apparatus for establishing a session, which is located in a V-PCRF and includes: a first receiving component, which is configured to receive an S9 session establishment triggering message from an H-PCRF, wherein the S9 session establishment triggering message is used for triggering establishment of an S9 session and a first S9 sub-session, and the first S9 sub-session is used for policy control of EPC-routed traffic; a determination component, which is configured to determine whether the S9 session has been or is being established; and an indication component, which is configured to indicate to the H-PCRF that the S9 session has been or is being established when it is determined by the determination component that the S9 session has been or is being established.

In an example embodiment, the indication component includes: a sending unit, which is configured to send an acknowledgement message to the H-PCRF, wherein the acknowledgement message carries an indicator for indicating that the S9 session has been or is being established.

In an example embodiment, the apparatus may further include: a second receiving component, which is configured to receive an S9 sub-session establishment triggering message from the H-PCRF, wherein the S9 sub-session establishment triggering message is used for triggering the establishment of the first S9 sub-session.

In another aspect, an embodiment of the disclosure provides an apparatus for establishing a session, which is located in an H-PCRF and includes: a first sending component, which is configured to send an S9 session establishment triggering message to a V-PCRF, wherein the S9 session establishment triggering message is used for triggering establishment of an S9 session and a first S9 sub-session, and the first S9 sub-session is used for policy control of EPC-routed traffic; a third receiving component, which is configured to receive an indicator which indicates that the S9 session has been or is being established from the V-PCRF; and a second sending component, which is configured to send an S9 sub-session establishment triggering message to the V-PCRF, wherein the S9 sub-session establishment triggering message is used for triggering the establishment of the first S9 sub-session.

In an example embodiment, the apparatus may further include: a detection component, which is configured to detect that the S9 session has not been established yet.

In another aspect, an embodiment of the disclosure may further provide a system for establishing a session, which includes the apparatus for establishing a session in the V-PCRF and the apparatus for establishing a session in the H-PCRF.

In the embodiments of the disclosure, the V-PCRF receives an S9 session establishment triggering message from the H-PCRF, wherein the S9 session establishment triggering message is used for triggering the establishment of an S9 session and a first S9 sub-session, and the first S9 sub-session is used for the policy control of EPC-routed traffic; the V-PCRF determines whether the S9 session has been or is being established; and when it is determined that the S9 session has been or is being established, the V-PCRF indicates the H-PCRF that the S9 session has been or is being established. By virtue of the above solution, conflict is avoided in the process of establishing the S9 sub-session in the related art and the stability of the system is improved.

BRIEF DESCRIPTION OF THE DRAWINGS

The drawings illustrated here are to provide further understanding of the disclosure and constitute one part of the application, and the exemplary embodiments of the disclosure and the explanations thereof are intended to explain the disclosure, instead of improperly limiting the disclosure. In the drawings.

DETAILED DESCRIPTION OF THE EMBODIMENTS

The embodiments of the disclosure will be described below in reference to the drawings and in combination with the embodiments in detail. It should be noted that, in case of no conflict, the embodiments of the application and features therein can be combined with each other.

Figure 5:
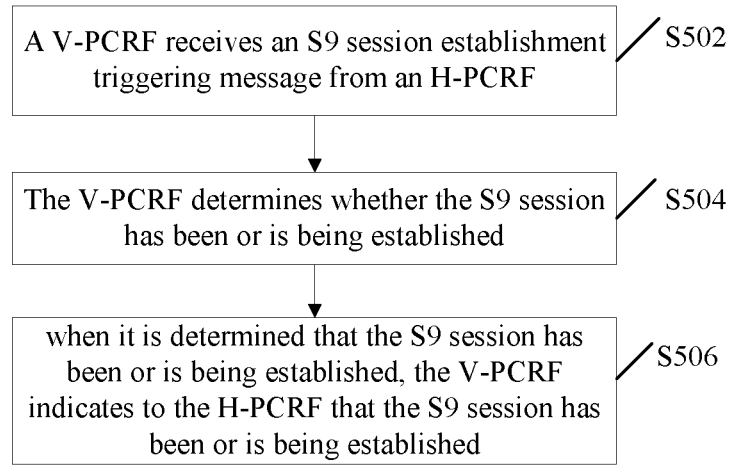
FIG. 5 is a flowchart of a method for establishing a session according to an embodiment of the disclosure.

A method for establishing a session is provided in an embodiment of the disclosure. FIG. 5 is a flowchart of a method for establishing a session according to an embodiment of the disclosure. As shown in FIG. 5, the method includes the following steps.

Step 502: A V-PCRF receives an S9 session establishment triggering message from an H-PCRF, wherein the S9 session establishment triggering message is used for triggering establishment of an S9 session and a first S9 sub-session, and the first S9 sub-session is used for policy control of EPC-routed traffic.

Step 504: The V-PCRF determines whether the S9 session has been or is being established.

Step 506: When it is determined that the S9 session has been or is being established, the V-PCRF indicates to the H-PCRF that the S9 session has been or is being established.

In this embodiment, the V-PCRF indicates to the H-PCRF that the S9 session has been or is being established when receiving the S9 session establishment triggering message from the H-PCRF and determining that the S9 session is being or has been established, so that a processing way is given to the V-PCRF when the S9 session establishment triggering message is received from the H-PCRF under the condition that the S9 session has been or is being established. By virtue of this solution, conflict is avoided in the process of establishing an S9 sub-session in the related art, and the stability of the system is improved.

As an example implementation way, the V-PCRF may indicate to the H-PCRF that the S9 session has been or is being established by carrying an indicator in a message. For example, the V-PCRF may send an acknowledgement message (such as a TEA message) to the H-PCRF, wherein the acknowledgement message carries an indicator for indicating that the S9 session has been or is being established.

In an example embodiment, before the V-PCRF determines whether the S9 session has been or is being established, the V-PCRF may have sent a session establishment message to the H-PCRF, wherein the session establishment message is used for the establishment of an S9 session and a second S9 sub-session; and the second S9 sub-session is used for the policy control of NSWO traffic.

In an example embodiment, after receiving the session establishment message from the V-PCRF, the H-PCRF may send an S9 sub-session establishment triggering message to the V-PCRF because the S9 session has been established, wherein the S9 sub-session establishment triggering message is used for triggering the establishment of the first S9 sub-session.

In an example embodiment, after receiving the S9 sub-session establishment triggering message from the H-PCRF, the V-PCRF may send a session modification message to the H-PCRF, wherein the session modification message is used for the establishment of the first S9 sub-session.

With respect to the method above, an apparatus for establishing a session may be further provided in an embodiment of the disclosure, which is located in a V-PCRF and is configured to implement the embodiments and the example implementation ways above, thereby needing no further description. As below, the term "component" can implement the combination of software and/or hardware of predetermined functions. Although the apparatus described in the following embodiments is preferably implemented by software, the implementation of hardware or the combination of the software and hardware can also be composed.

Figure 6:
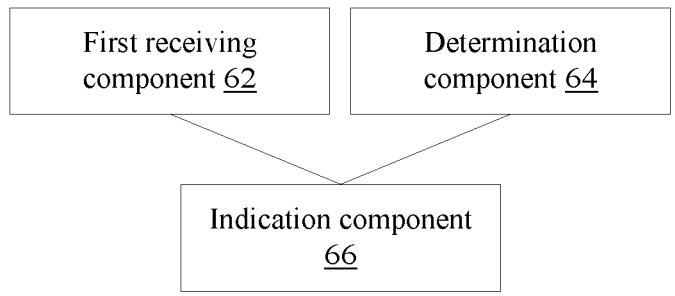
FIG. 6 is a block diagram showing a structure of an apparatus for establishing a session according to an embodiment of the disclosure.

FIG. 6 is a block diagram showing a structure of an apparatus for establishing a session according to an embodiment of the disclosure. As shown in FIG. 6, the apparatus includes: a first receiving component 62, a determination component 64 and an indication component 66, which are described below in detail.

The first receiving component 62 is configured to receive an S9 session establishment triggering message from an H-PCRF, wherein the S9 session establishment triggering message is used for triggering establishment of an S9 session and a first S9 sub-session, and the first S9 sub-session is used for policy control of EPC-routed traffic; the determination component 64 is configured to determine whether the S9 session has been or is being established; and the indication component 66 is coupled with the first receiving component 62 and the determination component 64 and is configured to indicate to the H-PCRF that the S9 session has been or is being established when the determination result of the determination component 64 is that the S9 session has been or is being established.

In the embodiment, through the components above, the indication component 66 indicates the H-PCRF that the S9 session has been or is being established when the V-PCRF receives the S9 session establishment triggering message from the H-PCRF through the first receiving component 62 and the determination component 64 determines that the S9 session is being or has been established, so that a processing way is given to the V-PCRF when the S9 session establishment triggering message is received from the H-PCRF under the condition that the S9 session has been or is being established. By virtue of the solution, conflict is avoided in the process of establishing an S9 sub-session in the related art, and the stability of the system is improved.

In an example embodiment, the indication component 66 may further include: a sending unit 662, which is configured to send an acknowledgement message to the H-PCRF, wherein the acknowledgement message carries an indicator for indicating that the S9 session has been or is being established.

Figure 7:
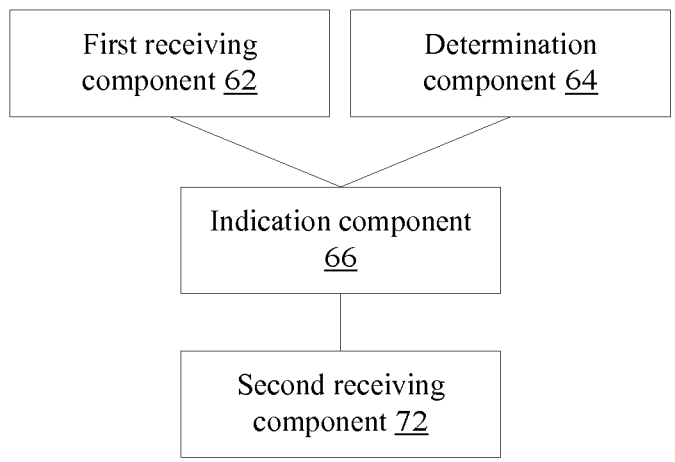
FIG. 7 is a block diagram showing an example structure of an apparatus for establishing a session according to an embodiment of the disclosure.

FIG. 7 is a block diagram showing an example structure of an apparatus for establishing a session according to an embodiment of the disclosure. As shown in FIG. 7, the apparatus may further include: a second receiving component 72, which is coupled with the indication component 66 and is configured to receive an S9 sub-session establishment triggering message from an H-PCRF, wherein the S9 sub-session establishment triggering message is used for triggering the establishment of a first S9 sub-session.

Figure 8:
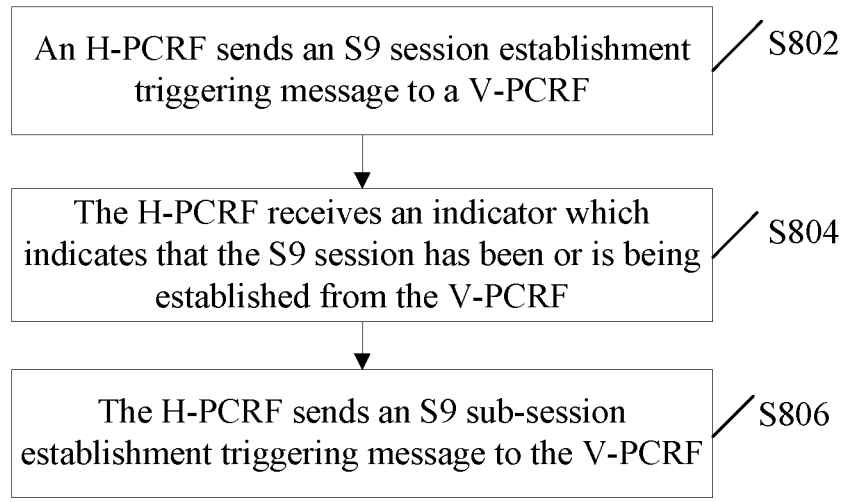
FIG. 8 is a flowchart of another method for establishing a session according to an embodiment of the disclosure.

Another method for establishing a session may be further provided in an embodiment of the disclosure. FIG. 8 is a flowchart of another method for establishing a session according to an embodiment of the disclosure. As shown in FIG. 8, the method includes the following steps:

Step 802: An H-PCRF sends an S9 session establishment triggering message to a V-PCRF, wherein the S9 session establishment triggering message is used for triggering establishment of an S9 session and a first S9 sub-session, and the first S9 sub-session is used for policy control of EPC-routed traffic.

Step 804: The H-PCRF receives an indicator which indicates that the S9 session has been or is being established from the V-PCRF.

Step 806: The H-PCRF sends an S9 sub-session establishment triggering message to the V-PCRF, wherein the S9 sub-session establishment triggering message is used for triggering the establishment of a first S9 sub-session.

In the embodiment, through the steps above, after sending the S9 session establishment triggering message to the V-PCRF, the H-PCRF receives the indicator which indicates that the S9 session has been or is being established from the V-PCRF and sends the S9 sub-session establishment triggering message to the V-PCRF, so that a processing way is given to the H-PCRF when the S9 session establishment triggering message is sent to the V-PCRF under the condition that the S9 session has been or is being established. By virtue of this solution, conflict is avoided in the process of establishing the S9 sub-session in the related art, and the stability of the system is improved.

As an example implementation way, the V-PCRF may indicate to the H-PCRF that the S9 session has been or is being established by carrying an indicator in a message. For example, the H-PCRF may receive an acknowledgement message (such as a TEA message) from the V-PCRF, wherein the acknowledgement message carries an indicator for indicating that the S9 session has been or is being established.

In an example embodiment, the reason why the H-PCRF sends the S9 session establishment message to the V-PCRF may be that the H-PCRF detects that the S9 session has not been established yet when determining it is necessary to send the S9 session establishment triggering message to the V-PCRF.

With respect to the method above, another apparatus for establishing a session may be further provided in an embodiment of the disclosure, which is located in an H-PCRF and is configured to implement the embodiments and the example implementation ways above, thereby needing no further description. As below, the term "component" can implement the combination of software and/or hardware of predetermined functions. Although the apparatus described in the following embodiments is preferably implemented by software, the implementation of hardware or the combination of the software and hardware can also be composed.

Figure 9:
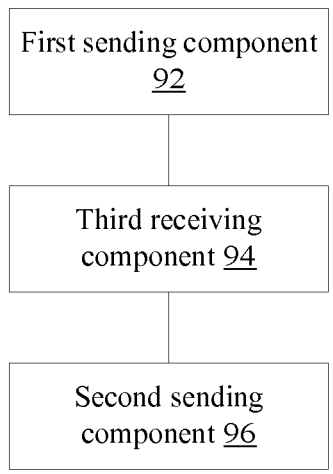
FIG. 9 is a block diagram showing a structure of another apparatus for establishing a session according to an embodiment of the disclosure.

FIG. 9 is a block diagram showing a structure of another apparatus for establishing a session according to an embodiment of the disclosure. As shown in FIG. 9, the apparatus includes: a first sending component 92, a third receiving component 94 and a second sending component 96, which are described below in detail.

The first sending component 92 is configured to send an S9 session establishment triggering message to a V-PCRF, wherein the S9 session establishment triggering message is used for triggering establishment of an S9 session and a first S9 sub-session, and the first S9 sub-session is used for policy control of EPC-routed traffic; the third receiving component 94 is coupled with the first sending component 92 and is configured to receive an indicator which indicates that the S9 session has been or is being established from the V-PCRF; and the second sending component 96 is coupled with the third receiving component 94 and is configured to send an S9 sub-session establishment triggering message to the V-PCRF, wherein the S9 sub-session establishment triggering message is used for triggering the establishment of the first S9 sub-session.

In the embodiment, through the component above, after the H-PCRF sends the S9 session establishment triggering message to the V-PCRF through the first sending component 92, the third receiving component 94 receives the indicator which indicates that the S9 session has been or is being established from the V-PCRF and the H-PCRF sends the S9 sub-session establishment triggering message to the V-PCRF through the second sending component 96, so that a processing way is given to the H-PCRF when the S9 session establishment triggering message is sent to the V-PCRF under the condition that the S9 session has been or is being established. By virtue of this solution, conflict is avoided in the process of establishing the S9 sub-session in the related art, and the stability of the system is improved.

Figure 10:
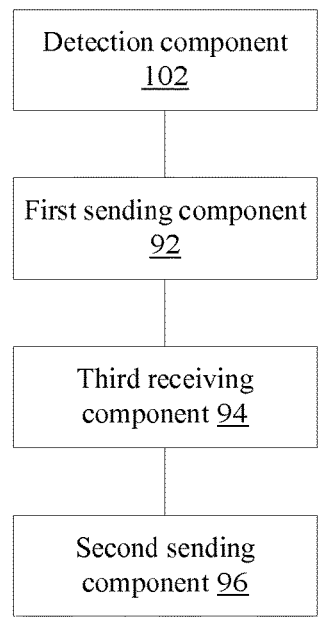
FIG. 10 is a block diagram showing an example structure of another component for establishing a session according to an embodiment of the disclosure.

FIG. 10 is a block diagram showing an example structure of another component for establishing a session according to an embodiment of the disclosure. As shown in FIG. 10, the apparatus may further include: a detection component 102, which is coupled with the first sending component 92 and is configured to detect that the S9 session has not been established yet.

Figure 11:
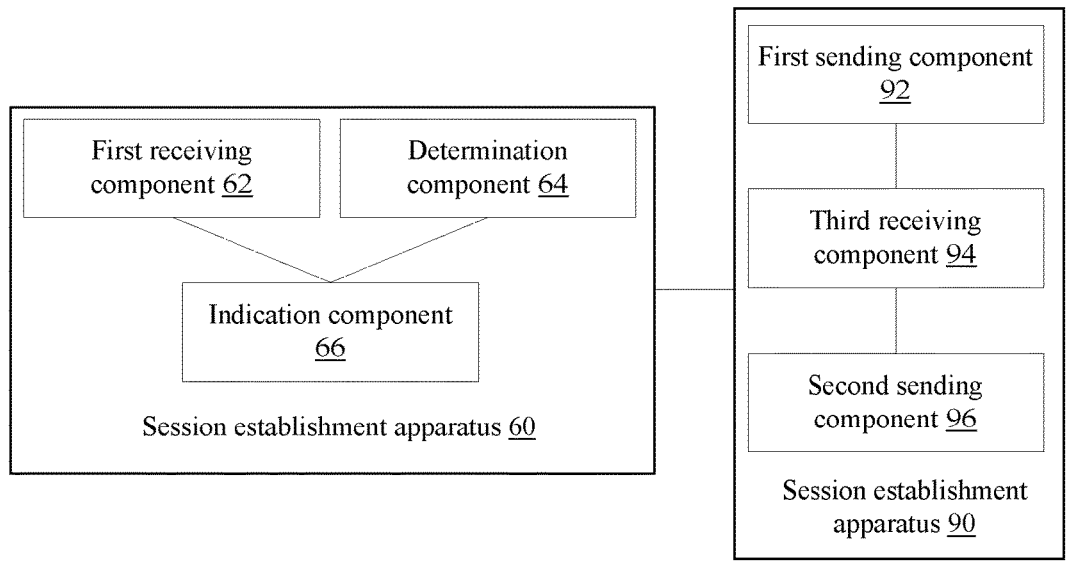
FIG. 11 is a block diagram showing a structure of a system for establishing a session according to an embodiment of the disclosure.

A system for establishing a session may be further provided in this embodiment. FIG. 11 is a block diagram showing a structure of a system for establishing a session according to an embodiment of the disclosure. As shown in FIG. 11, the system includes the apparatus 60 for establishing a session in a V-PCRF in FIG. 6 or 7 (the apparatus for establishing a session in FIG. 6 is described in FIG. 11 as an example), and may further include the apparatus 90 for establishing a session in an H-PCRF in FIG. 9 or 10 (the apparatus for establishing a session in FIG. 9 is described in FIG. 11 as an example).

The apparatus is described below in combination with an example embodiment, which combines the embodiment above and its example implementation way.

A method and an apparatus for processing a session conflict are provided in the following example embodiment. The method includes: after receiving an S9 session establishment triggering message from an H-PCRF, a V-PCRF carries an indicator which indicates that an S9 session has been or is being established in an acknowledgement message if having initialized the establishment of the S9 session; and the H-PCRF sends an S9 sub-session establishment triggering message to the V-PCRF after the S9 session initialized by the V-PCRF is established.

First Embodiment

Figure 1:
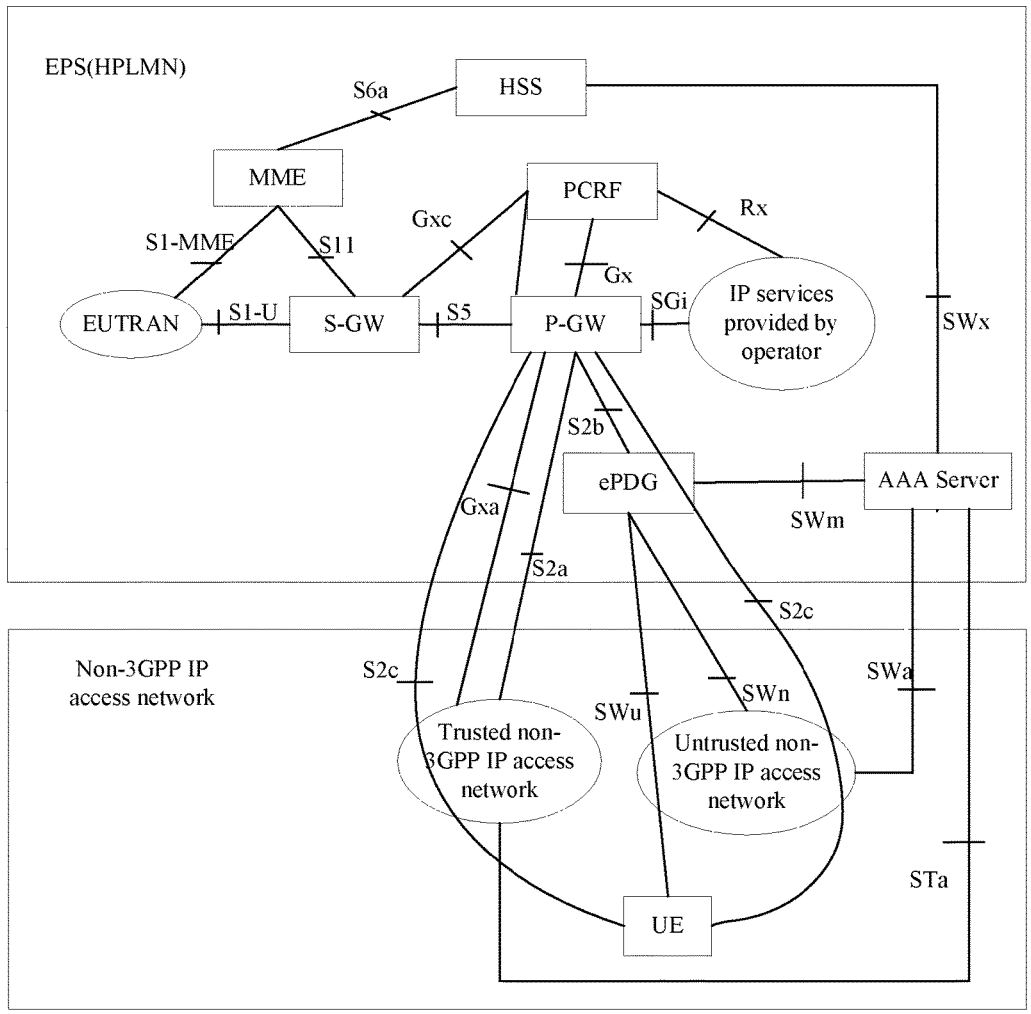
FIG. 1 is a diagram showing a composition architecture of a 3GPP EPS according to the related art.
Figure 2:
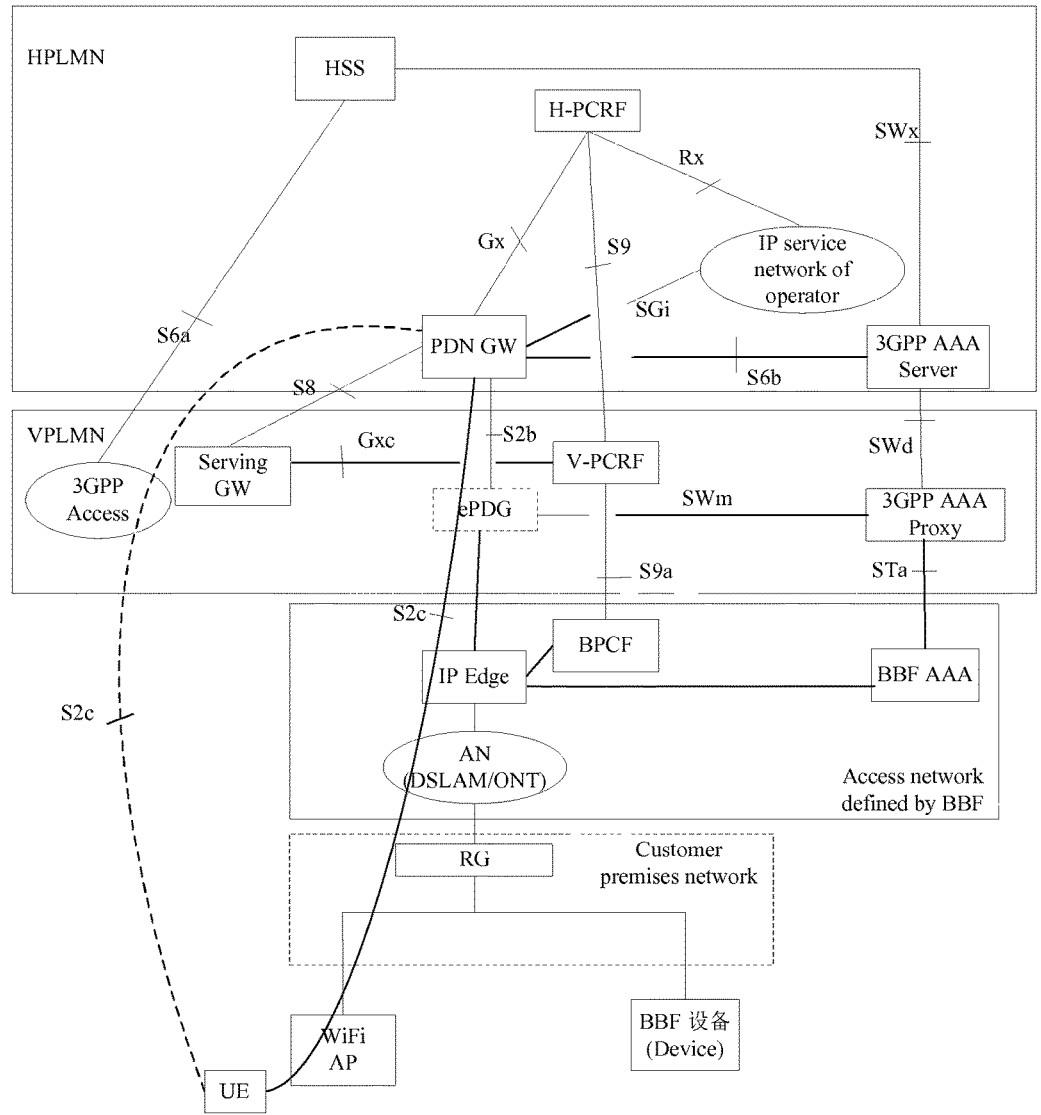
FIG. 2 is a diagram showing a roaming architecture of a home router in a policy interworking scenario in which a UE accesses a 3GPP core network through a BBF access network according to the related art.
Figure 12:
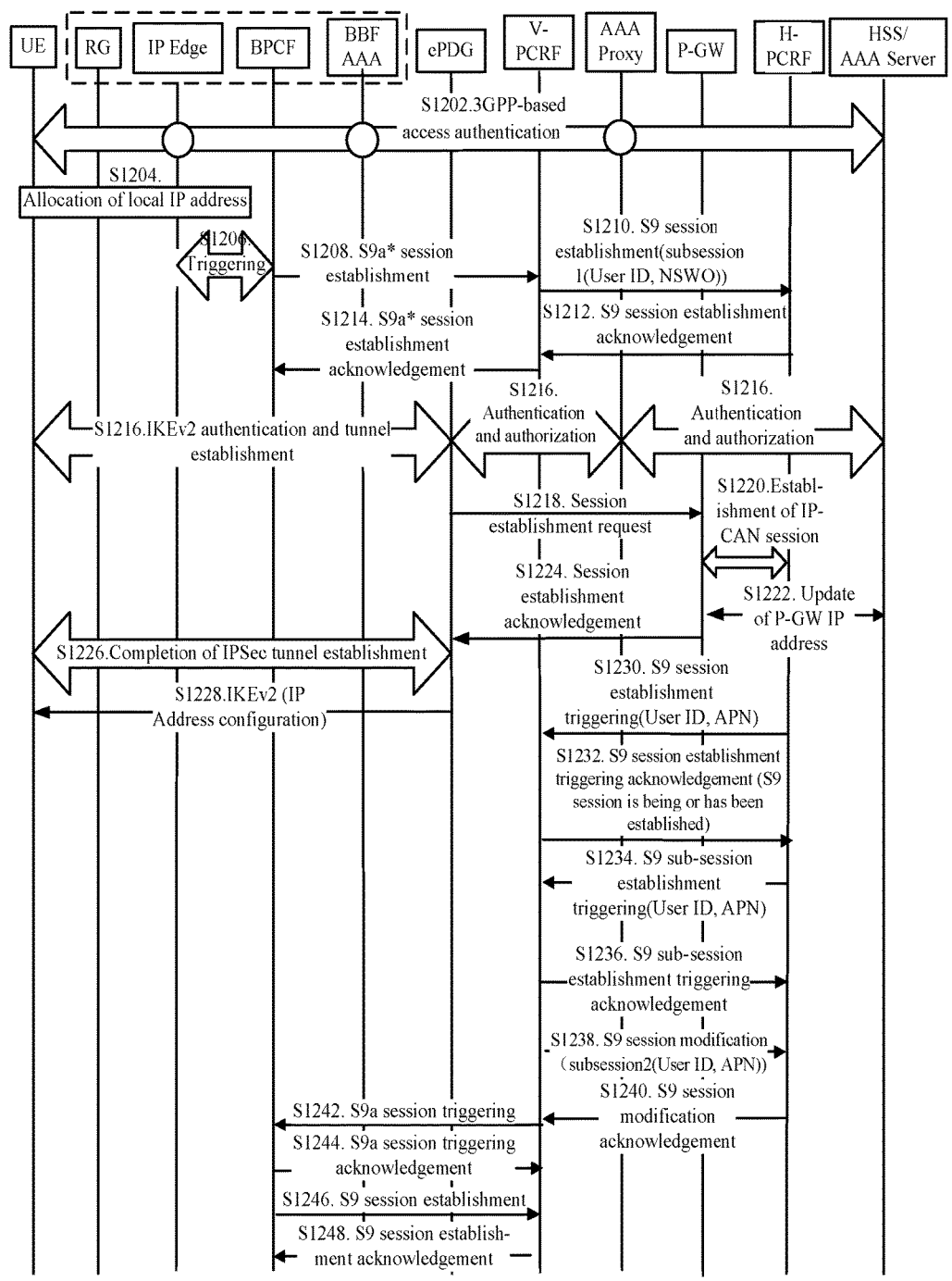
FIG. 12 is a flowchart of a method for processing a session conflict according to a first embodiment of the disclosure.

FIG. 12 is a flowchart of a method for processing a session conflict according to a first embodiment of the disclosure. As shown in FIG. 12, which is a diagram showing the attachment flow when a UE accesses a 3GPP through the PMHV6 protocol based on the diagram showing an architecture in FIG. 2, wherein the ePDG and the P-GW adopt GPRS Tunnel Protocol (GTP), the flow includes the following steps:

Steps 1202 to 1228 are consistent with Steps 402 to 428.

Step 1230: Having not received the S9 session establishment message sent in Step 1210 yet, the H-PCRF determines that the S9 session of the user has not been established yet, so that the H-PCRF sends a TER message (an S9 session establishment triggering message) to the V-PCRF to trigger the establishment of the S9 session and an S9 sub-session which is used for the policy control of EPC-routed traffic, wherein the message carries a user identifier, an APN, a local IP address of the UE and other information.

Step 1232: Detecting that the S9 session has been or is being established, the V-PCRF returns a TEA message to the H-PCRF, wherein the message carries an indicator which indicates that the S9 session has been or is being established.

Step 1234: The H-PCRF receives the S9 session sent in Step 1210, and sends an RAR message (an S9 sub-session establishment triggering message) to the V-PCRF to trigger the establishment of an S9 sub-session, wherein the message carries a user identifier, an APN and a local IP address of the UE.

Step 1236: The V-PCRF returns an acknowledgment message (RAA) to the H-PCRF to confirm the S9 sub-session establishment triggering message.

Step 1238: The V-PCRF sends a CCR message (an S9 session modification message) to the H-PCRF to modify the S9 session and establish an S9 sub-session, wherein the sub-session contains a user identifier, an APN and a local IP address of the UE; and the sub-session is used for the policy control of EPC-routed traffic.

Step 1240: The H-PCRF returns a CCA message to the V-PCRF to confirm the S9 session modification message.

Step 1242: Triggered by Step 1234, the V-PCRF sends a TER message to the BPCF to trigger the establishment of an S9a session, wherein the message carries a user identifier and a local IP address of the UE.

Step 1244: The BPCF returns a TEA message to the V-PCRF to confirm the S9a session establishment triggering message.

Step 1246: The BPCF sends a CCR message to the V-PCRF to request for establishing an S9a session.

Step 1248: The V-PCRF returns a CCA message to the BPCF to confirm the establishment of the S9a session.

Then, the BPCF provides a policy to an IP edge.

In other embodiments, Steps 1234 to 1248 can be executed in the following order:

Step 1234': The H-PCRF receives the S9 session in Step 1210, and sends an RAR message (an S9 sub-session establishment triggering message) to the V-PCRF to trigger the establishment of an S9 sub-session, wherein the message carries a user identifier, an APN and a local IP address of the UE.

Step 1236': The V-PCRF sends a TER message to the BPCF to trigger the establishment of an S9a session, wherein the message carries a user identifier and a local IP address of the UE.

Step 1238': The BPCF returns a TEA message to the V-PCRF to confirm the S9a session establishment triggering message.

Step 1240': The V-PCRF returns an acknowledgment message (RAA) to the H-PCRF to confirm the S9 sub-session establishment triggering message.

Step 1242': The BPCF sends a CCR message to the V-PCRF to request for establishing an S9a session.

Step 1244': The V-PCRF sends a CCR message (an S9 session modification message) to the H-PCRF to modify the S9 session and establish an S9 sub-session, wherein the sub-session contains a user identifier, an APN and a local IP address of the UE; and the sub-session is used for the policy control of EPC-routed traffic.

Step 1246': The H-PCRF returns a CCA message to the V-PCRF to confirm the S9 session modification message.

Step 1248': The V-PCRF returns a CCA message to the BPCF to confirm the establishment of the S9a session.

Second Embodiment

Figure 3:
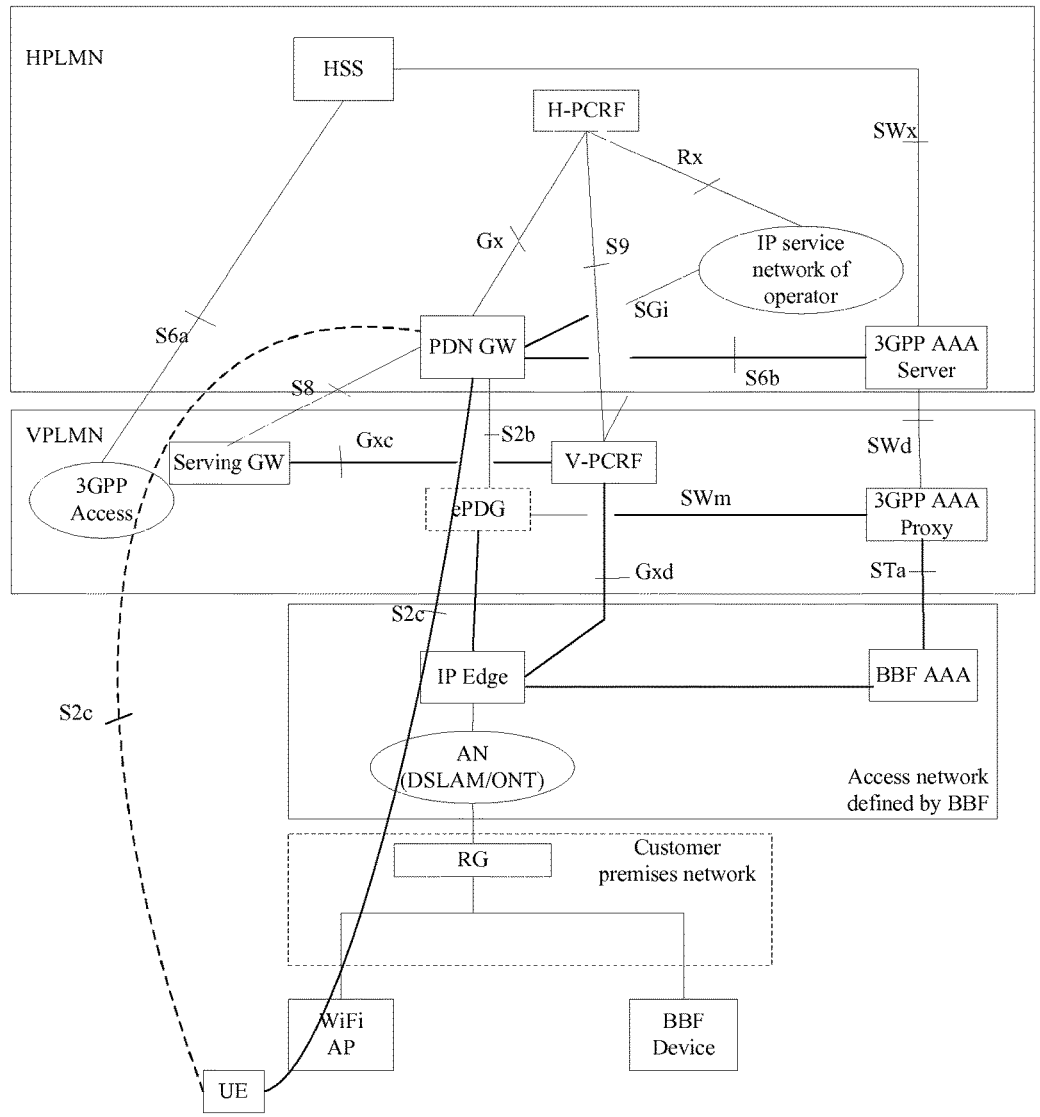
FIG. 3 is a diagram showing the roaming architecture of a home router in a policy convergence scenario in which a UE accesses a 3GPP core network through a BBF access network according to the related art.
Figure 4:
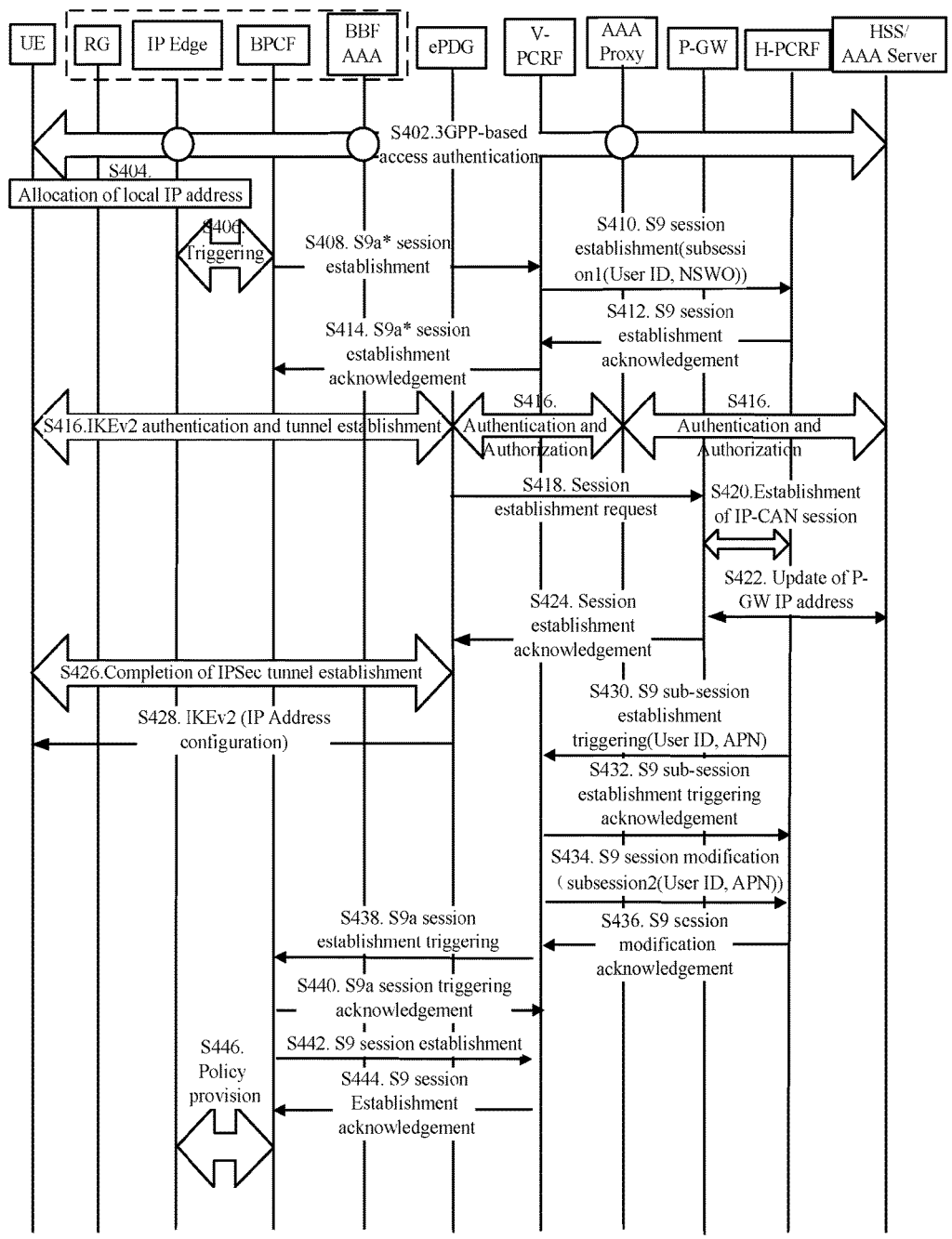
FIG. 4 is a diagram showing the attachment flow when a UE accesses a 3GPP core network through a fixed broadband access network according to the related art.
Figure 13:
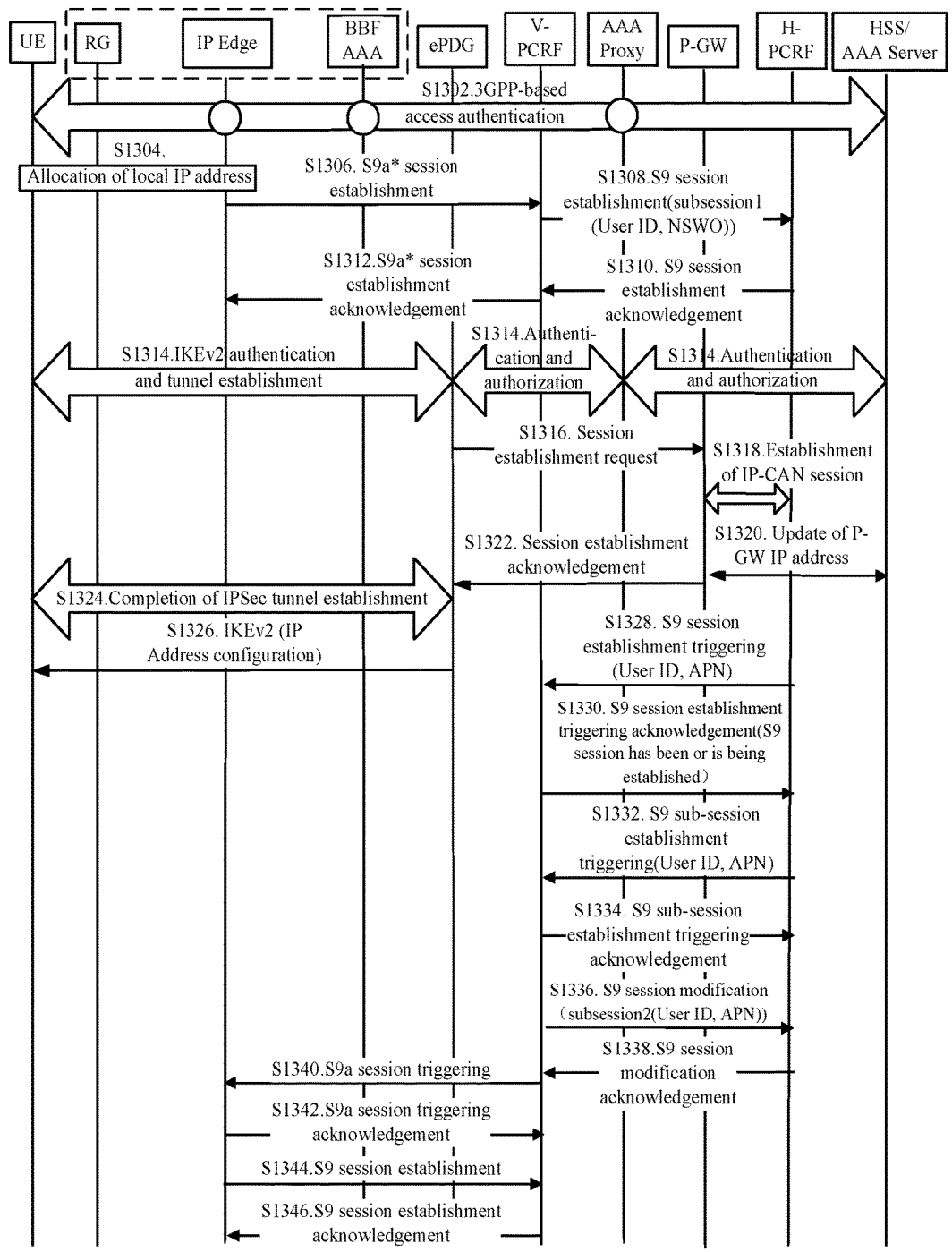
FIG. 13 is a flowchart of a method for processing a session conflict according to a second embodiment of the disclosure.

FIG. 13 is a flowchart of a method for processing a session conflict according to a second embodiment of the disclosure. As shown in FIG. 13, which is a diagram showing the attachment flow when a UE accesses a 3GPP through the PMHV6 protocol based on the diagram showing an architecture in FIG. 3, wherein the ePDG and the P-GW adopt GPRS Tunnel Protocol (GTP), the flow includes the following steps:

Step 1302: A UE accesses a BBF access system to execute 3GPP-based access authentication. A BBF AAA interacts with a 3GPP AAA server through a 3GPP AAA proxy (or an AAA server further interacts with an HSS) to complete EAP authentication.

Step 1304: The UE acquires a local IP address allocated by the BBF access network.

Step 1306: When receiving triggering and supporting policy interworking with the PCRF, the IP edge sends a CCR message to the V-PCRF to request for establishing an S9a* session if a local policy indicates that policy control for NSWO traffic can be provided to the user, wherein the message carries a user identifier, a local IP address of the UE and NSWO-APN.

Step 1308: When determining that the S9 session of the user has not been established yet, the V-PCRF sends a CCR message to the H-PCRF to request for establishing the S9 session and an S9 sub-session, wherein the sub-session contains an information user identifier, a local IP address of the UE and NSWO-APN; the V-PCRF saves the corresponding relationship between the S9a* session and the S9 sub-session; and the S9 sub-session is used for the policy control of NSWO traffic.

Step 1310: The H-PCRF returns an acknowledgement message (i.e., a CCA message) after making a policy decision and sends the policy to the V-PCRF through the S9 sub-session.

Step 1312: The V-PCRF further sends the policy to the IP edge through the CCA message.

Steps 1314 to 1346 are similar to Steps 1216 to 1248, and the difference lies in that the V-PCRF directly interacts with the IP edge rather than the BPCF.

Third Embodiment

Figure 14:
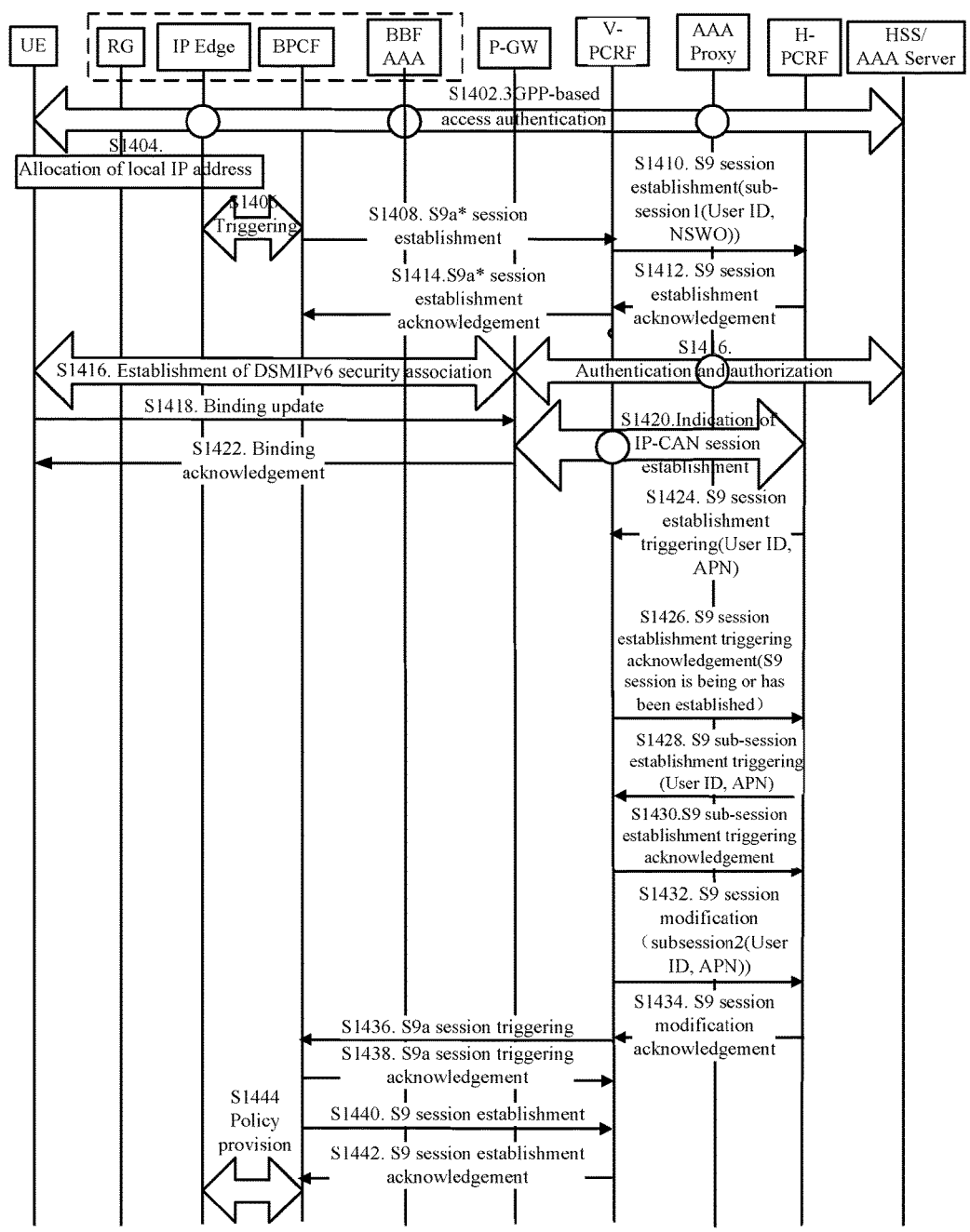
FIG. 14 is a flowchart of a method for processing a session conflict according to a third embodiment of the disclosure.

FIG. 14 is a flowchart of a method for processing a session conflict according to a third embodiment of the disclosure. As shown in FIG. 14, which is a diagram showing the attachment flow when a UE accesses a 3GPP through the DSMHV6 protocol based on the diagram showing an architecture in FIG. 2, and the flow includes the following steps:

Step 1402: A UE accesses a BBF access system to execute 3GPP-based access authentication; and a BBF AAA interacts with a 3GPP AAA server through a 3GPP AAA proxy (or an AAA server further interacts with an HSS) to complete EAP authentication.

Step 1404: The UE acquires a local IP address allocated by the BBF access network.

Step 1406: Triggered by Step 1402 or 1404, a BPCF is notified of the access of the UE through the BBF access network.

Step 1408: When receiving triggering and supporting policy interworking with the PCRF, the BPCF sends a CCR message to the V-PCRF to request for establishing an S9a* session if a local policy indicates that policy control for NSWO traffic can be provided to the user, wherein the message carries a user identifier, a local IP address of the UE and NSWO-APN.

Step 1410: When determining that the S9 session of the user has not been established yet, the V-PCRF sends a CCR message to the H-PCRF to request for establishing the S9 session and an S9 sub-session, wherein the sub-session contains an information user identifier, a local IP address of the UE and NSWO-APN; the V-PCRF saves the corresponding relationship between the S9a* session and the S9 sub-session; and the S9 sub-session is used for the policy control of NSWO traffic.

Step 1412: The H-PCRF returns an acknowledgement message (i.e., a CCA message) after making a policy decision and sends the policy to the V-PCRF through the S9 sub-session.

Step 1414: The V-PCRF further sends the policy to the BPCF through the CCA message.

Step 1416: The UE executes Bootstraping flow. The UE searches a Domain Name System (DNS) according to an Access Point Name (APN) to acquire the IP address of the P-GW of the PDN which it will access. To protect the DSMIPv6 message between the UE and the P-GW, the UE establishes a security association through IKEv2 and carries out authentication through EAP. The P-GW communicates with an AAA server (or the AAA server further interacts with the HSS) to complete EAP authentication; and at the same time, the P-GW allocates an IPv6 address or a prefix to the UE to take it as a Home Address (HoA) of the UE.

Step 1418: The UE sends a DSMHV6 binding update message to the P-GW, wherein the message carries CoA and HoA. In the binding message, the lifetime parameter is not zero. The P-GW establishes a binding context.

Step 1420: The PCEF in the P-GW sends an IP-CAN session establishment indication message to the H-PCRF. The H-PCRF carries out QoS authorization according to the user identifier and other information and returns an acknowledgement message to the PCEF in the P-GW.

Step 1422: The P-GW returns a binding acknowledgement message to the UE.

Step 1424: Having not received the S9 session establishment message sent in Step 1410 yet, the H-PCRF determines that the S9 session of the user has not been established yet, and sends a TER message (an S9 session establishment triggering message) to the V-PCRF to trigger the establishment of the S9 session and an S9 sub-session which is used for the policy control of EPC-routed traffic, wherein the message carries a user identifier, an APN, a local IP address of the UE and other information.

Step 1426: Detecting that the S9 session has been or is being established, the V-PCRF returns a TEA message to the H-PCRF, wherein the message carries an indicator which indicates that the S9 session has been or is being established.

Step 1428: The H-PCRF receives the S9 session sent in Step 1410, and sends an RAR message (an S9 sub-session establishment triggering message) to the V-PCRF to trigger the establishment of an S9 sub-session, wherein the message carries a user identifier, an APN and a local IP address of the UE.

Step 1430: The V-PCRF returns an acknowledgment message (RAA) to the H-PCRF to confirm the S9 sub-session establishment triggering message.

Step 1432: The V-PCRF sends a CCR message (an S9 session modification message) to the H-PCRF to modify the S9 session and establish another S9 sub-session, wherein the sub-session contains a user identifier, an APN and a local IP address of the UE; and the sub-session is used for the policy control of EPC-routed traffic.

Step 1434: The H-PCRF returns a CCA message to the V-PCRF to confirm the S9 session modification message.

Step 1436: Triggered by Step 1428, the V-PCRF sends a TER message to the BPCF to trigger the establishment of an S9a session, wherein the message carries a user identifier and a local IP address of the UE.

Step 1438: The BPCF returns a TEA message to the V-PCRF to confirm the S9a session establishment triggering message.

Step 1440: The BPCF sends a CCR message to the V-PCRF to request for establishing an S9a session.

Step 1442: The V-PCRF returns a CCA message to the BPCF to confirm the establishment of the S9a session.

Step 1444: The BPCF provides a policy to an IP edge.

In other embodiments, Steps 1428 to 1444 can be executed in the following order: Step 1428': The H-PCRF receives the S9 session sent in Step 1410, and sends an RAR message (an S9 sub-session establishment triggering message) to the V-PCRF to trigger the establishment of an S9 sub-session, wherein the message carries a user identifier, an APN and a local IP address of the UE.

Step 1430': The V-PCRF sends a TER message to the BPCF to trigger the establishment of an S9a session, wherein the message carries a user identifier and a local IP address of the UE.

Step 1432': The BPCF returns a TEA message to the V-PCRF to confirm the S9a session establishment triggering message.

Step 1434': The V-PCRF returns an acknowledgment message (RAA) to the H-PCRF to confirm the S9 sub-session establishment triggering message.

Step 1436': The BPCF sends a CCR message to the V-PCRF to request for establishing an S9a session.

Step 1438': The V-PCRF sends a CCR message (an S9 session modification message) to the H-PCRF to modify the S9 session and establish an S9 sub-session, wherein the sub-session contains a user identifier, an APN and a local IP address of the UE; and the sub-session is used for the policy control of EPC-routed traffic.

Step 1440': The H-PCRF returns a CCA message to the V-PCRF to confirm the S9 session modification message.

Step 1442': The V-PCRF returns a CCA message to the BPCF to confirm the establishment of the S9a session.

Step 1444': The BPCF provides a policy to an IP edge.

Fourth Embodiment

Figure 15:
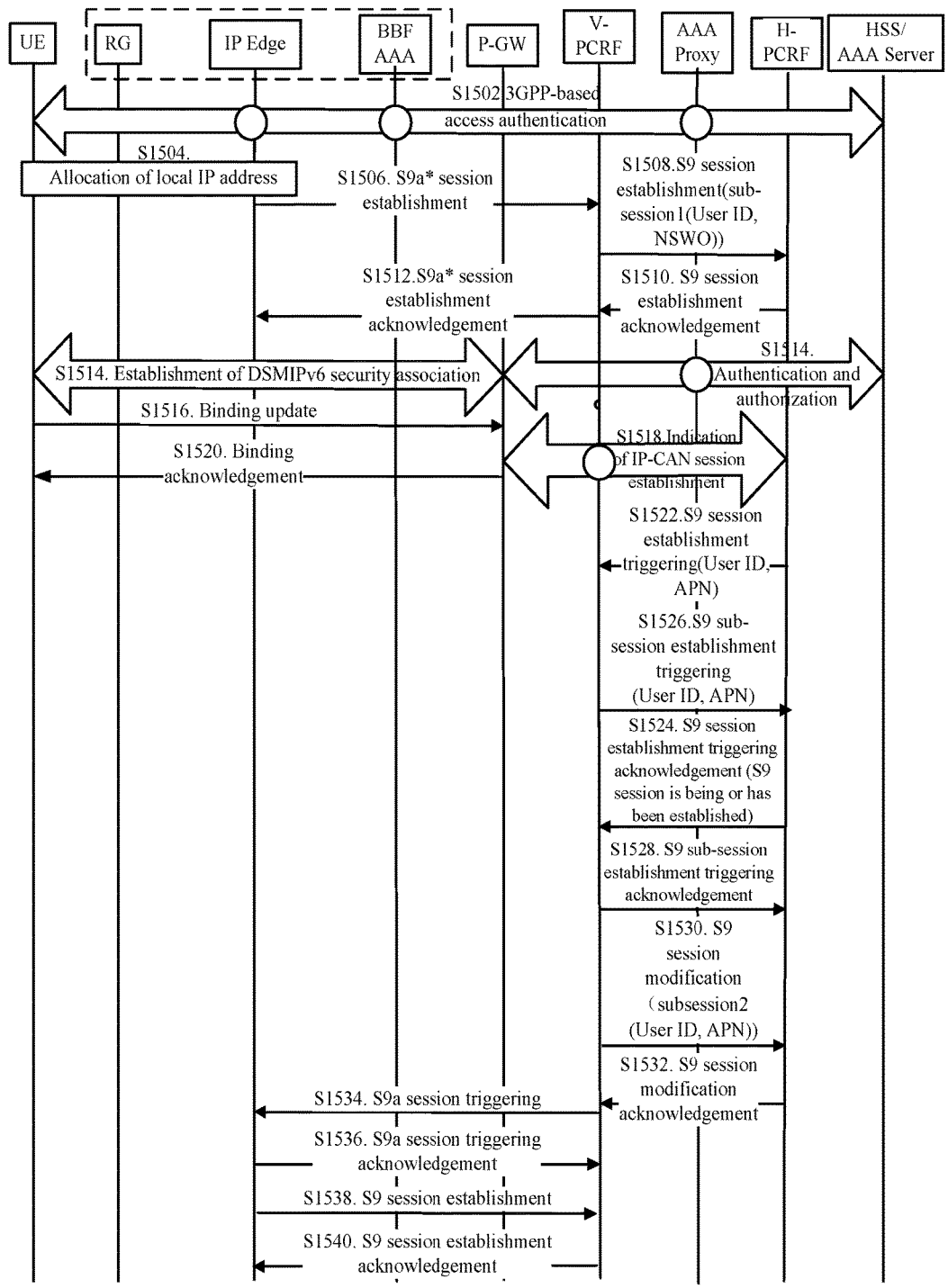
FIG. 15 is a flowchart of a method for processing a session conflict according to a fourth embodiment of the disclosure.

FIG. 15 is a flowchart of a method for processing a session conflict according to a fourth embodiment of the disclosure. As shown in FIG. 15, which is a diagram showing the attachment flow when a UE accesses a 3GPP through the DSMHV6 protocol based on the diagram showing an architecture in FIG. 3, and the flow includes the following steps:

Step 1502: A UE accesses a BBF access system to execute 3GPP-based access authentication. A BBF AAA interacts with a 3GPP AAA server through a 3GPP AAA proxy (or an AAA server further interacts with an HSS) to complete EAP authentication.

Step 1504: The UE acquires a local IP address allocated by the BBF access network.

Step 1506: When receiving triggering and supporting policy interworking with the PCRF, the IP edge sends a CCR message to the V-PCRF to request for establishing an S9a* session if a local policy indicates that policy control for NSWO traffic can be provided to the user, wherein the message carries a user identifier, a local IP address of the UE and NSWO-APN.

Step 1508: When determining that the S9 session of the user has not been established yet, the V-PCRF sends a CCR message to the H-PCRF to request for establishing the S9 session and an S9 sub-session, wherein the sub-session contains an information user identifier, a local IP address of the UE and NSWO-APN. The V-PCRF saves the corresponding relationship between the S9a* session and the S9 sub-session. The S9 sub-session is used for the policy control of NSWO traffic.

Step 1510: The H-PCRF returns an acknowledgement message (i.e., a CCA message) after making a policy decision and sends the policy to the V-PCRF through the S9 sub-session.

Step 1512: The V-PCRF further sends the policy to the IP edge through the CCA message.

Steps 1514 to 1540 are similar to Step 1416 to 1442, and the difference lies in that the V-PCRF directly interacts with the IP edge rather than the BPCF.

In another embodiment, software is further provided, which is configured to execute the technical schemes described in the embodiments and example embodiments above.

In another embodiment, a storage medium is further provided, in which the software is stored. The storage medium includes but is not limited to a compact disk, a floppy disk, a hard disk, an erasable memory and the like.

INDUSTRIAL APPLICABILITY

Through the embodiments above, the stability of the system is improved and good industrial applicability is achieved.

Obviously, those skilled in the art shall understand that the components or steps of the disclosure may be implemented by general computing apparatus and centralized in a single computing apparatus or distributed in a network consisting of multiple computing apparatus. Optionally, the components or steps may be implemented by program codes executable by the computing apparatus, so that they may be stored in a storage apparatus and executed by the computing apparatus, and, in some cases, the steps can be executed in a sequence different from the illustrated or described sequence, or they are respectively made into the integrated circuit components or many of them are made into a single integrated circuit component. By doing so, the disclosure is not limited to any specific combination of hardware and software.

What said above are only the example embodiments of the disclosure and not intended to limit the disclosure. For those skilled in the art, various modifications and changes can be made in the disclosure. Any modifications, equivalent replacements, improvements and the like within the principle of the disclosure shall fall within the scope of protection as defined by the appended claims of the disclosure.

What is claimed is:

1. A method for establishing a session, comprising:
   receiving, by a Visit Policy and Charging Rules Function (V-PCRF), an S9 session establishment triggering message from a Home Policy and Charging Rules Function (H-PCRF), wherein the S9 session establishment triggering message is used for triggering establishment of an S9 session and a first S9 sub-session, and the first S9 sub-session is used for policy control of Evolved Packet Core (EPC)-routed traffic;
   determining, by the V-PCRF, whether the S9 session has been or is being established; and
   indicating, by the V-PCRF, to the H-PCRF that the S9 session has been or is being established, when it is determined that the S9 session has been or is being established.

2. The method according to claim 1, wherein indicating, by the V-PCRF, to the H-PCRF that the S9 session has been or is being established comprises:
   sending, by the V-PCRF, an acknowledgement message to the H-PCRF, wherein the acknowledgement message carries an indicator for indicating that the S9 session has been or is being established.

3. The method according to claim 1, wherein before determining, by the V-PCRF, whether the S9 session has been or is being established, the method further comprises:
   sending, by the V-PCRF, a session establishment message to the H-PCRF, wherein the session establishment message is used for the establishment of the S9 session and a second S9 sub-session, and the second S9 sub-session is used for policy control of Non-seamless WLAN Offload (NSWO) traffic.

4. The method according to claim 3, wherein after sending, by the V-PCRF, the session establishment message to the H-PCRF, the method further comprises:

receiving, by the H-PCRF, the session establishment message from the V-PCRF; and
sending, by the H-PCRF, an S9 sub-session establishment triggering message to the V-PCRF, wherein the S9 sub-session establishment triggering message is used for triggering the establishment of the first S9 sub-session.

5. The method according to claim 4, wherein after sending, by the H-PCRF, the S9 sub-session establishment triggering message to the V-PCRF, the method further comprises:
   sending, by the V-PCRF, a session modification message to the H-PCRF, wherein the session modification message is used for the establishment of the first S9 sub-session.

6. A method for establishing a session, comprising:
   sending, by a Home Policy and Charging Rules Function (H-PCRF), an S9 session establishment triggering message to a Visit Policy and Charging Rules Function (V-PCRF), wherein the S9 session establishment triggering message is used for triggering establishment of an S9 session and a first S9 sub-session, and the first S9 sub-session is used for policy control of Evolved Packet Core (EPC)-routed traffic;
   receiving, by the H-PCRF, an indicator which indicates that the S9 session has been or is being established from the V-PCRF; and
   sending, by the H-PCRF, an S9 sub-session establishment triggering message to the V-PCRF, wherein the S9 sub-session establishment triggering message is used for triggering the establishment of the first S9 sub-session.

7. The method according to claim 6, wherein receiving, by the H-PCRF, the indicator which indicates that the S9 session has been or is being established from the V-PCRF comprises:
   receiving, by the H-PCRF, an acknowledgement message from the V-PCRF, wherein the acknowledgement message carries an indicator for indicating that the S9 session has been or is being established.

8. The method according to claim 6, wherein before sending, by the H-PCRF, the S9 session establishment triggering message to the V-PCRF, the method further comprises:
   detecting, by the H-PCRF, that the S9 session has not been established yet.

9. An apparatus for establishing a session, wherein the apparatus is located in a Visit Policy and Charging Rules Function (V-PCRF) and comprises:
   a first receiving component to receive an S9 session establishment triggering message from a Home Policy and Charging Rules Function (H-PCRF), wherein the S9 session establishment triggering message is used for triggering establishment of an S9 session and a first S9 sub-session, and the first S9 sub-session is used for policy control of Evolved Packet Core (EPC)-routed traffic;
   a determination component to determine whether the S9 session has been or is being established; and
   an indication component to indicate to the H-PCRF that the S9 session has been or is being established when it is determined by the determination component that the S9 session has been or is being established.

10. The apparatus according to claim 9, wherein the indication component comprises:
    a sending unit to send an acknowledgement message to the H-PCRF, wherein the acknowledgement message carries an indicator for indicating that the S9 session has been or is being established.

11. The apparatus according to claim 9, further comprising:
a second receiving component to receive an S9 sub-session establishment triggering message from the H-PCRF, wherein the S9 sub-session establishment triggering message is used for triggering the establishment of a first S9 sub-session.

12. An apparatus for establishing a session, wherein the apparatus is located in a Home Policy and Charging Rules Function (H-PCRF) and comprises:
a first sending component to send an S9 session establishment triggering message to a Visit Policy and Charging Rules Function (V-PCRF), wherein the S9 session establishment triggering message is used for triggering establishment of an S9 session and a first S9 sub-session, and the first S9 sub-session is used for policy control of Evolved Packet Core (EPC)-routed traffic;
a third receiving component to receive an indicator which indicates that the S9 session has been or is being established from the V-PCRF; and
a second sending component to send an S9 sub-session establishment triggering message to the V-PCRF, wherein the S9 sub-session establishment triggering message is used for triggering establishment of the first S9 sub-session.

13. The apparatus according to claim 12, further comprising:
a detection component to detect that the S9 session has not been established yet.

14. A system for establishing a session, comprising the apparatus for establishing a session in the V-PCRF in claim 9 and an apparatus for establishing a session in the H-PCRF, wherein the apparatus for establishing a session in the H-PCRF comprises:
a first sending component to send an S9 session establishment triggering message to a Visit Policy and Charging Rules Function (V-PCRF), wherein the S9 session establishment triggering message is used for triggering establishment of an S9 session and a first S9 sub-session, and the first S9 sub-session is used for policy control of Evolved Packet Core (EPC)-routed traffic;
a third receiving component to receive an indicator which indicates that the S9 session has been or is being established from the V-PCRF; and
a second sending component to send an S9 sub-session establishment triggering message to the V-PCRF, wherein the S9 sub-session establishment triggering message is used for triggering establishment of the first S9 sub-session.

15. The method according to claim 7, wherein before sending, by the H-PCRF, the S9 session establishment triggering message to the V-PCRF, the method further comprises:
detecting, by the H-PCRF, that the S9 session has not been established yet.

16. The apparatus according to claim 10, further comprising:
a second receiving component to receive an S9 sub-session establishment triggering message from the H-PCRF, wherein the S9 sub-session establishment triggering message is used for triggering the establishment of a first S9 sub-session.

17. A system for establishing a session, comprising the apparatus for establishing a session in the V-PCRF in claim 10 and an apparatus for establishing a session in the H-PCRF, wherein the apparatus for establishing a session in the H-PCRF comprises:
a first sending component to send an S9 session establishment triggering message to a Visit Policy and Charging Rules Function (V-PCRF), wherein the S9 session establishment triggering message is used for triggering establishment of an S9 session and a first S9 sub-session, and the first S9 sub-session is used for policy control of Evolved Packet Core (EPC)-routed traffic;
a third receiving component to receive an indicator which indicates that the S9 session has been or is being established from the V-PCRF; and
a second sending component to send an S9 sub-session establishment triggering message to the V-PCRF, wherein the S9 sub-session establishment triggering message is used for triggering establishment of the first S9 sub-session.

18. A system for establishing a session, comprising the apparatus for establishing a session in the V-PCRF in claim 11 and an apparatus for establishing a session in the H-PCRF, wherein the apparatus for establishing a session in the H-PCRF comprises:
a first sending component to send an S9 session establishment triggering message to a Visit Policy and Charging Rules Function (V-PCRF), wherein the S9 session establishment triggering message is used for triggering establishment of an S9 session and a first S9 sub-session, and the first S9 sub-session is used for policy control of Evolved Packet Core (EPC)-routed traffic;
a third receiving component to receive an indicator which indicates that the S9 session has been or is being established from the V-PCRF; and
a second sending component to send an S9 sub-session establishment triggering message to the V-PCRF, wherein the S9 sub-session establishment triggering message is used for triggering establishment of the first S9 sub-session.

19. The system according to claim 14, wherein the apparatus for establishing the session in the H-PCRF further comprises:
a detection component to detect that the S9 session has not been established yet.

20. The system according to claim 17, wherein the apparatus for establishing the session in the H-PCRF further comprises:
a detection component to detect that the S9 session has not been established yet.

* * * * *